United States Patent
Chiang et al.

(10) Patent No.: US 7,215,370 B2
(45) Date of Patent: May 8, 2007

(54) PSEUDO-BJT BASED RETINAL FOCAL-PLANE SENSING SYSTEM

(75) Inventors: Cheng-Ta Chiang, Chiayi (TW); Chung-Yu Wu, Hsinchu (TW)

(73) Assignee: AlphaPlus Semiconductor Inc., Hsinchu (TW)

( * ) Notice: Subject to any disclaimer, the term of this patent is extended or adjusted under 35 U.S.C. 154(b) by 819 days.

(21) Appl. No.: 10/624,517

(22) Filed: Jul. 23, 2003

(65) Prior Publication Data

US 2005/0018062 A1    Jan. 27, 2005

(51) Int. Cl.
*H04N 3/14* (2006.01)
*H04N 5/217* (2006.01)
*H04N 5/228* (2006.01)
*G01R 19/00* (2006.01)
*H01L 27/00* (2006.01)
*H01L 31/062* (2006.01)

(52) U.S. Cl. .................. 348/308; 348/302; 348/241; 348/222.1; 327/53; 250/208.1; 257/292

(58) Field of Classification Search ............... None
See application file for complete search history.

(56) References Cited

U.S. PATENT DOCUMENTS

| | | | | |
|---|---|---|---|---|
| 4,556,911 A | * | 12/1985 | Imaide et al. | 348/310 |
| 5,461,425 A | * | 10/1995 | Fowler et al. | 348/294 |
| 5,796,281 A | * | 8/1998 | Saeki et al. | 327/53 |
| 6,020,768 A | * | 2/2000 | Lim | 327/77 |
| 6,130,423 A | * | 10/2000 | Brehmer et al. | 348/308 |
| 6,323,719 B1 | * | 11/2001 | Chang et al. | 327/478 |
| 6,704,050 B1 | * | 3/2004 | Washkurak et al. | 348/294 |
| 6,798,250 B1 | * | 9/2004 | Wile | 327/51 |
| 6,940,551 B2 | * | 9/2005 | Merrill | 348/241 |

* cited by examiner

*Primary Examiner*—David Ometz
*Assistant Examiner*—Nhan T. Tran
(74) *Attorney, Agent, or Firm*—Troxell Law Office, PLLC (57) ABSTRACT

A Pseudo Bipolar Junction Transistor(Pseudo-BJT) based retinal focal-plane sensing system is an instant image sensing and front-end processing system with the advantages of high dynamic range and instant image processing. In addition, the system proposes a Pseudo-BJT based retinal focal-plane sensor with adaptive current Schmitt trigger and smoothing network for applying a new Pseudo-BJT circuit structure to mimic parts of functions of the cells in the outer plexiform layer of the real retina. It is suitable to resolve the existing technical drawbacks performing major functions in optical image detecting circuits, such as image recognition, image tracing, robot vision, bar-code/character readers, etc.

10 Claims, 9 Drawing Sheets

PSEUDO-BJT BASED RETINAL FOCAL-PLANE SENSING SYSTEM

BACKGROUND OF THE INVENTION

1) Field of the Invention

The invention relates to an optical sensing system, in particular, a retinal focal-plane sensor chip that is structured on Pseudo Bipolar Junction Transistor (Pseudo-BJT) and comprises a system with an adaptive current Schmitt trigger and a smoothing network for optical image detecting circuits, such as image identification, image tracing, robot vision readers of image, barcode or character, etc.

2) Description of the Prior Art

Rapid development of science and technology has made the semi-conductor and IT industries continuously rising and flourishing, resulting in outstanding changes in considerable application fields. Such changes not only make achievement of science and technology, but also improve our quality of life and alter our patterns of life. Since 1980, the researches in silicon retina have been developed one after another emphasizing how to attain the H cell function by circuits applying Gaussian smoothing to signals. How to enable retina and cerebrum visual functions to be performed by silicon chip has become a great challenge in recent years. In the event that silicon retina and silicon neural network can be developed, human visual system functions or its partial functions can be attained in electronic systems to greatly enhance the capability of instant image processing system and further be applied to the fields of image recognition, image tracing and robot vision.

An organism's retina is an excellent instant image sensing and front-end processing system with the advantages of high dynamic range and instant image processing, hence, more and more R&D people are attracted to research the possibility of using IC for realizing the retina function.

Among those researches, the most attractive structure was Resistor Network proposed by Caver Mead. The structure employed photo bipolar junction transistor (PBJT) to convert light into electric signal and simulate the sensitization of P cell. Subsequently, the signal is implanted into the Resistor Network generating similar Gaussian smoothing signal for simulating the H cell function. Consequently, both signals subtract each other obtaining a B cell signal. The Resistor Network in this structure is only composed of megaohms resistance; however, a large resistance still occupies a larger chip area during the Integrated Circuit(IC) design. Even though there have been various researches and methods for improving the drawback mentioned above, nevertheless, the chip area of silicon retina of Resistor Network is still too large. In addition to the above drawbacks of Resistor Network, there are two problems while PBJTs are applied: (1) the chip area is large when BJT-based retinal sensor is manufactured; (2) the PBJTs have smaller current gain when the technology scales down to 0.25 um or below. In view of the drawbacks and problems mentioned above, it is obvious that BJT-based technique is not suitable to be applied in the future manufacturing and optical applications.

SUMMARY OF THE INVENTION

In view of the foregoing, the present invention employs a unique neuron bipolar transistor to simulate partial retina functions forming a silicon retina chip with very tight structure and the functions of tunable image-averaging and detecting moving objects. At present, researches on organism's retina have the latest development that signals from retinal cell can be detected. Therefore, the objective of this invention is to apply the latest research of current retinal cell signals to rectify relevant circuit structures for achieving more retinal functions. In addition, following the front-end process of the silicon retinal chip, the back-end process is to make higher level images forming a complete vision system. The invention focuses on moving objects processing and further utilizes the neural network for realizing instant image processing system. This invention is designed to make great contribution to four fields:

Firstly, the invention is applicable to optical sensors, such as bar-code/character readers, by employing the design of the silicon retinal circuit structure. The high dynamic range characteristics of utilizing the silicon retinal circuit structure enables an optical sensor to be operated under less-lighting environment without applying additional illuminant. In addition, a silicon retinal circuit has the contrast enhancement characteristic that inputted gray-scale images can be enhanced and outputted as black/white images, thereby effectively reducing imaging data size and enabling the optical sensor to be suitable for the application of instant image processing. Therefore, the optical sensor is suitable for bar-code/character readers.

Secondly, the research of retinal cell signal can be eventually developed toward implanted silicon retinal chip helping the blind to regain eyesight. Thus, such research shall be a significant breakthrough in the biology and medical science fields.

Thirdly, the newest silicon retinal structure can be utilized for designing highly accurate motion sensing chip. This design has high value in either national defense industry or light industry for daily life. Moreover, the newest silicon retinal structure can be used for cooperating with the image processing circuit in the back-end neural network to form an instant image processing System-on-Chip. Such design is also important to national defense industry and light industry for daily life.

In view of the foregoing, this invention proposes a Pseudo-BJT based retinal focal-plane sensing system for resolving the above problems, comprising the following technical characteristics:

A. the silicon retinal structure of Resistor Network applies MOSFET to replace electric resistance that occupies larger area.

B. the current gain of this invention is designed according to various requirements through the proportions of parameters of geometrical patterns resulting in adaptive variations, without being restricted within the manufacturing requirements; whereas the current gain of BJT-based optical sensor is limited to the manufacturing requirements.

C. the chip area of a Pseudo-BJT based retinal sensor is smaller than that of a photo bipolar junction transistor based (BJT-based).

D. this Pseudo-BJT technique is suitable for general CMOS manufacturing process.

In addition, this invention comprises the following modules and units: Row Decoder, column Decoder, Pixel Array Module and Data Buffer for achieving the aforementioned objectives.

To enable a further understanding of the structural features and the technical contents of the present invention, the brief description of the drawings below is followed by the detailed description of the preferred embodiment.

BRIEF DESCRIPTION OF THE DRAWINGS

FIGS. 8-*a* and 8-*b* are dc output characteristics of adaptive current Schmitt trigger of this invention.

DETAILED DESCRIPTION OF THE PREFERRED EMBODIMENTS

Figure 3:
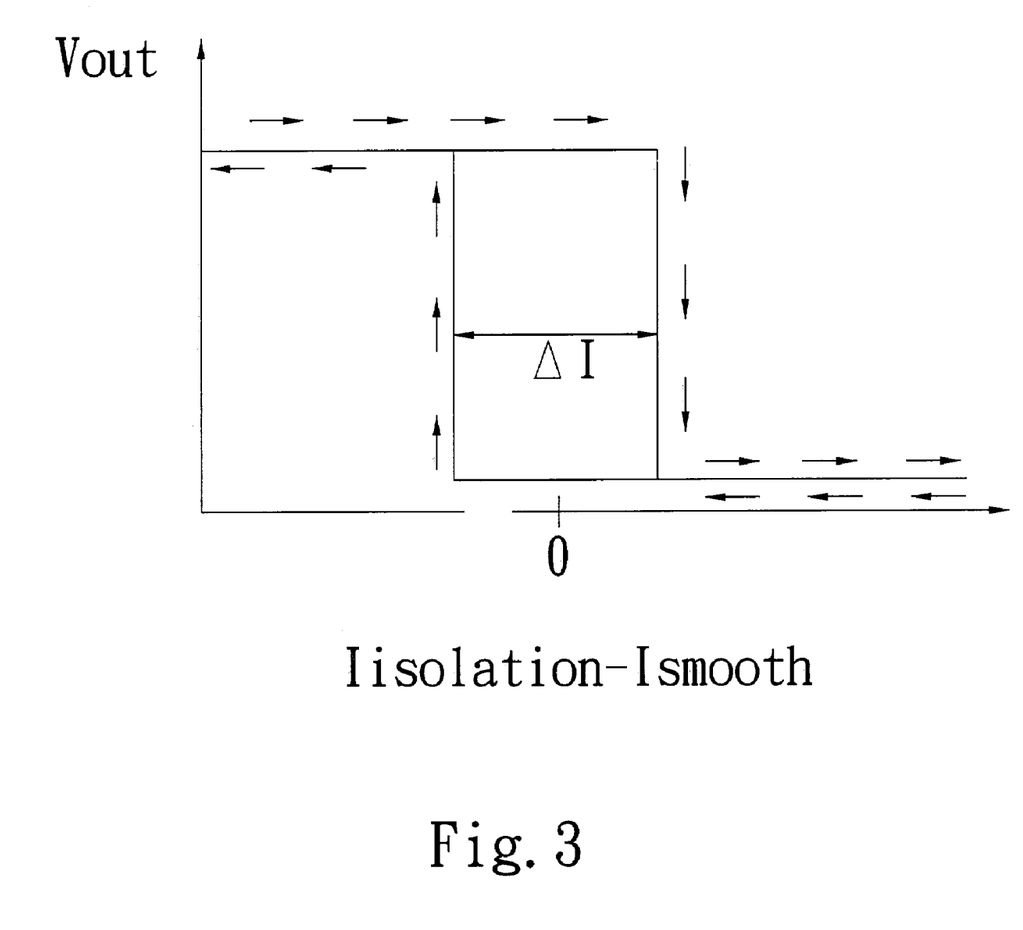
FIG. 3 is an adaptive current Schmitt trigger of proposed retinal focal-plane sensor of this invention.

This invention proposes a Pseudo-BJT based retinal focal-plane sensing system, which is a system with instant image sensing and front-end processing having the advantageous features of high dynamic range and instant image processing, etc. The invention is suitable to be applied in optical sensors, such as bar-code/character readers. This invention has the following features: Firstly, Adaptive current Schmitt trigger of the invention can be adjusted adaptively according to the value of induced photocurrent, which enhances noise immunity and eliminate noise disturbance. The proposed Pseudo-BJT focal-plane sensor circuit is operated in the subthreshold region. Therefore, the total power consumption of this invention is far less than that of BJT-based retinal sensor circuit. The noise disturbance sometimes misled the retinal sensor, that is, the sensor mistakes an unreality for a detected object owing to the impact of noise disturbance, thereby an adaptive current Schmitt trigger is used for eliminating the impact caused by noise disturbance. FIG. 3 shows the adaptive current Schmitt trigger of proposed retinal focal-plane sensor of this invention that a current hysteresis $\Delta I$ is the quality of the current Schmitt trigger in which the input threshold changes as a function of the input current level. Adding current hysteresis in the retinal sensor circuit could enhance the function of photocurrent noise immunity and eliminate noise disturbance.

Secondly, the value of an electric resistance generated by the Pseudo-BJT Based smoothing network can be changed according to external bias circuit with the function of eliminating noise disturbance. The actual consumed area of the invention is far less than that of Resistor Network. The main function relating to the H cell has the function of Low-Pass Filter. Therefore, the value of an electric resistance can be changed according to external bias circuit, thereby resulting in different high frequency noise to be eliminated, having higher tunable capability comparing with electric resistance of the past.

Figure 1:
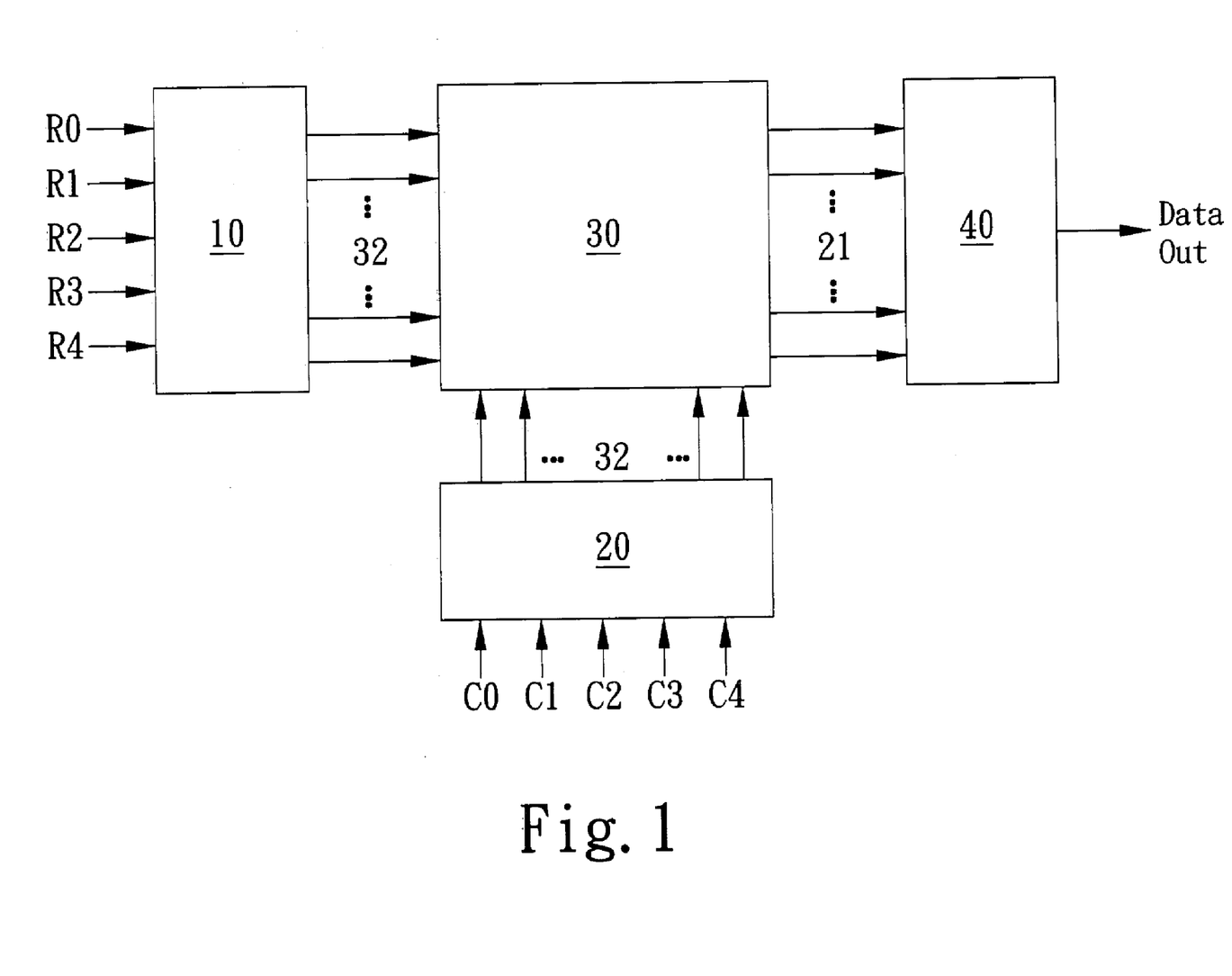
FIG. 1 is the architecture of the proposed retinal focal-plane sensor chip of this invention.

A preferred embodiment of the invention is illustrated herein by the technique mentioned above. Refer to FIG. 1, the architecture of the proposed retinal focal-plane sensor chip of this invention is depicted as follows.

The invention uses the image sensing principle of human's retinal cell for realizing it by unique chip design thereof. Real retinal detecting cells can be divided into three kinds of functions: a Photoreceptor cell (P cell) is to do photo-input sensing lacking the function of eliminating noise disturbance; a Horizontal cell(H cell) is to smooth an image retrieved by P cell with the Low-Pass Filter function enabling partial high frequent noise to be eliminated; and a Bipolar cell(B cell) is to balance both outputs of P cell and H cell to attain edge detection and have the function of eliminating noise disturbance, i.e., the front-end image processing system. The retinal focal-plane sensor mimics the functions of the three cells in a single pixel for performing major functions in image processing. The Pseudo-BJT based retinal focal-plane sensing system of this invention comprises the following modules and units:

A Row Decoder 10 is used for detecting external images, randomly selecting desired pixel and generating a row address;

A column Decoder 20 is used for detecting external images, randomly selecting desired pixel and generating a column address;

A Pixel Array Module 30 is used for reading pixels and detecting external images, in addition, pixel voltages appointed by the Row Decoder 10 and the column Decoder 20 are outputted one by one. A voltage is generated when an image signal is received by the row address and the column address; Pixel Array Module 30 is able to accurately detect external images through the adaptive current Schmitt trigger; and A Data Buffer 40 is to convert the parallel data to serial data in order to reduce output pins of the chip.

The Row and Column Decoders are able to randomly select desired pixel.

Each pixel has the functions of a retinal focal-plane sensor, an adaptive current Schmitt trigger and smoothing network, thereby consisting of a 32×32 Pixel Array Module.

In addition, the internal motions of the retinal focal-plane sensor are described as follows, First of all, an image is presented on the 32×32 Pixel Array Module 3, light-induced outputted voltage goes to High and dark outputted voltage goes to Low, each pixel voltage on the 32×32 array is outputted. Pixel voltages appointed by the Row Decoder 10 and the column Decoder 20 are outputted one by one. At last, the Data Buffer 40 converts the parallel data to serial data in order to reduce output pins of the chip.

Figure 2:
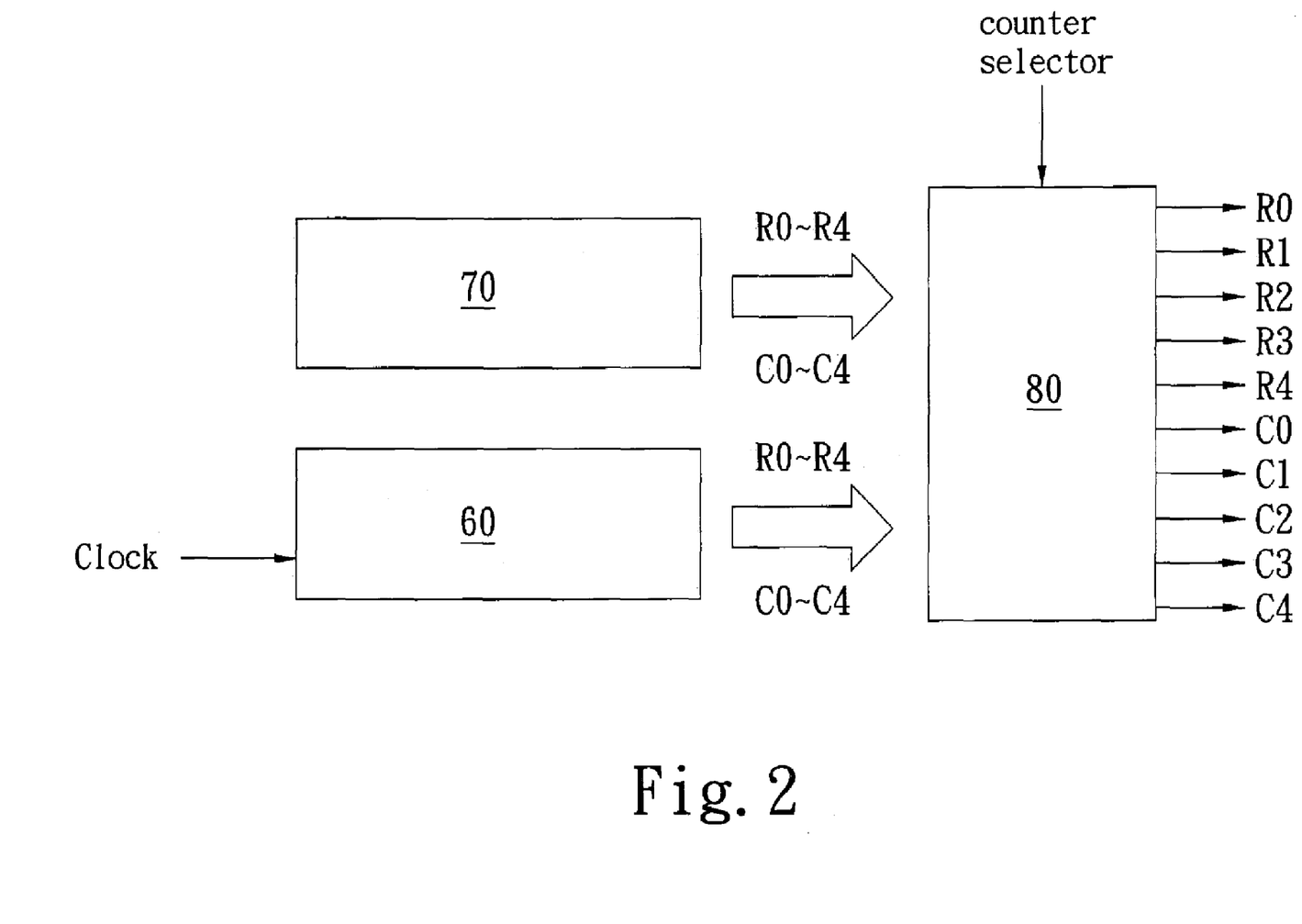
FIG. 2 is a block diagram of counter for selecting external or internal row and column addresses.

FIG. 2 is the block diagram of counter for selecting external or internal row and column addresses depicted as follows.

Each pixel data of the 32×32 array in FIG. 2 has to be read and a 2-D Counter 60 is to produce total addresses for all pixels continually for the Row Decoder 10 and the column Decoder 20 to process. Therefore, the Row Decoder 10 and the column Decoder 20 are able to appoint pixels one by one enabling the pixels to output voltages thereof. For some of special applications, it would be randomly accessed the output of desired pixels by external addresses. Nevertheless, each 9×9 pixel output requires an External Random Access 70 to appoint external addresses for a COUNTER SELECTOR to select internal or external row and column addresses. Subsequently, a Multiplexer 80 is to provide the addresses for the Row Decoder 10 and the column Decoder 20 to process.

Figure 4:
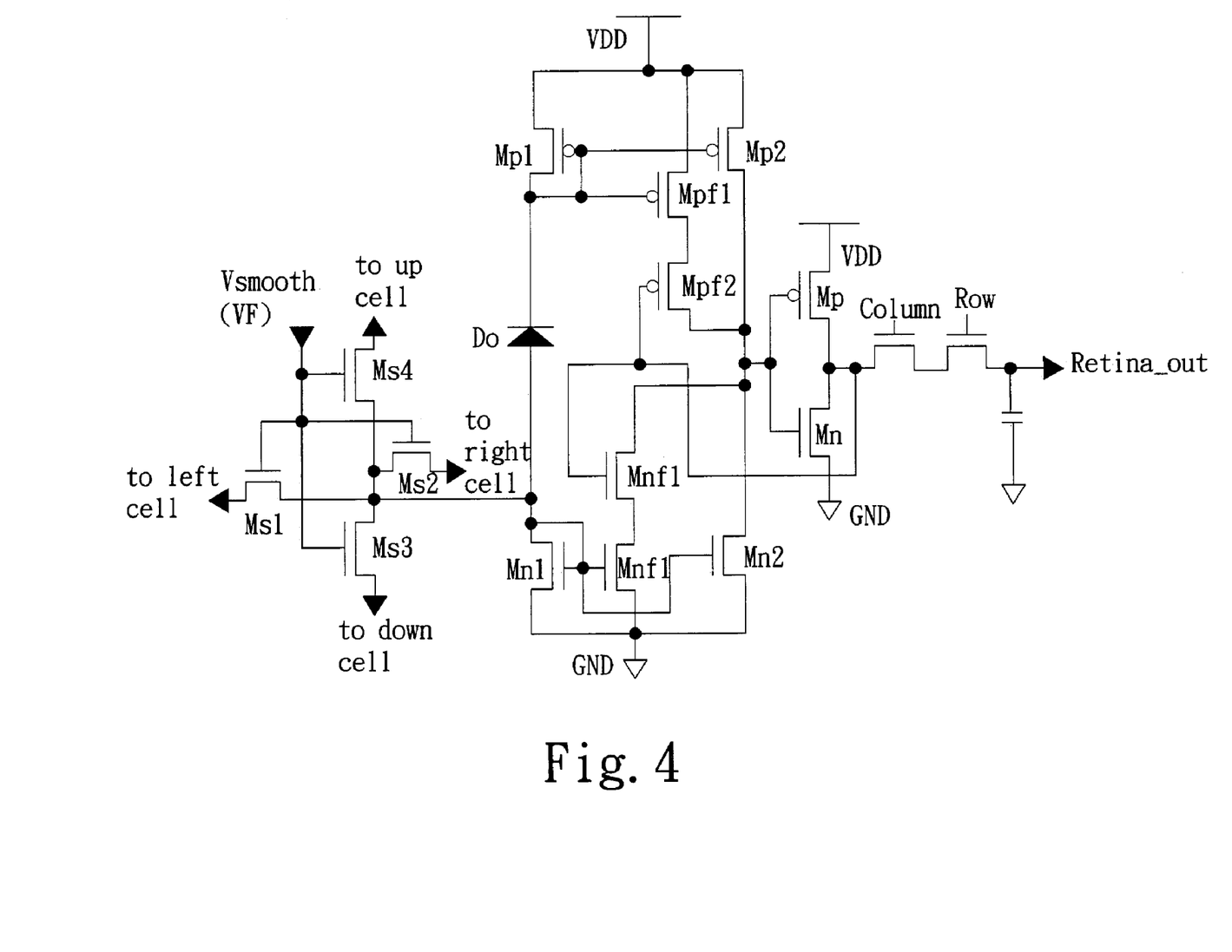
FIG. 4 is a pixel structure of proposed retinal focal-plane sensor circuit of this invention.

The pixel structure of proposed retinal focal-plane sensor circuit of this invention in FIG. 4 is depicted as follows. The new retinal pixel circuit comprises a Photodiode DO, two Pseudo-BJTs, four adjustable N-channel MOS resistors of the smoothing network as Ms1-Ms4, a set of adaptive current Schmitt trigger comprising Mnf1-Mnf2 and Mpf1-Mpf2, an Inverter comprising transistors Mn and Mp, and row and column controlled switch transistors.

FIG. 4 shows that Mp1 and MP2 are P cells composing a PNP Pseudo-BJT; Mn1 and Mn2 are H cells composing a NPN Pseudo-BJT; where the B cell balances both outputs of P cell and H cell on the circuit connection, thereby Pseudo-BJTs and pixel areas are reduced. Photoreceptor cell (P cell) is to do photo-input sensing lacking the function of eliminating noise disturbance; a Horizontal cell(H cell) is to smooth an image retrieved by P cell with the Low-Pass Filter function enabling partial high frequent noise to be eliminated; and a Bipolar cell(B cell) is to balance both outputs of P cell and H cell to attain edge detection and have the function of eliminating noise disturbance The detailed flow of the circuit is as follows:

(1) D0 is detected and photocurrent is then generated, incorporating Mp1 and MP2 for the P cell to process.

(2) Mn1 and Mn2(H cell) are used for incorporating with smoothing network, Ms1-Ms4 to activate the image smoothing function; the electric resistance of four MOS resistors is controlled by the gate voltage Vsmooth(VF) with the Low-Pass Filter function enabling partial high frequent noise to be eliminated.

(3) Mp2 and Mn2 have the connection between thereof activating the B cell functions.

(4) Mnf1-Mnf2 and Mpf1-Mpf2 are composed by the adaptive current Schmitt trigger for eliminating noise disturbance.

(5) an outputted Inverter converts analogue signals into digital signals.

(6) the Row and Column controlled switch transistors are controlled by the Row and Column Decoders, thereby only appointed pixels are able to output signals (Retina_out).

Figure 5:
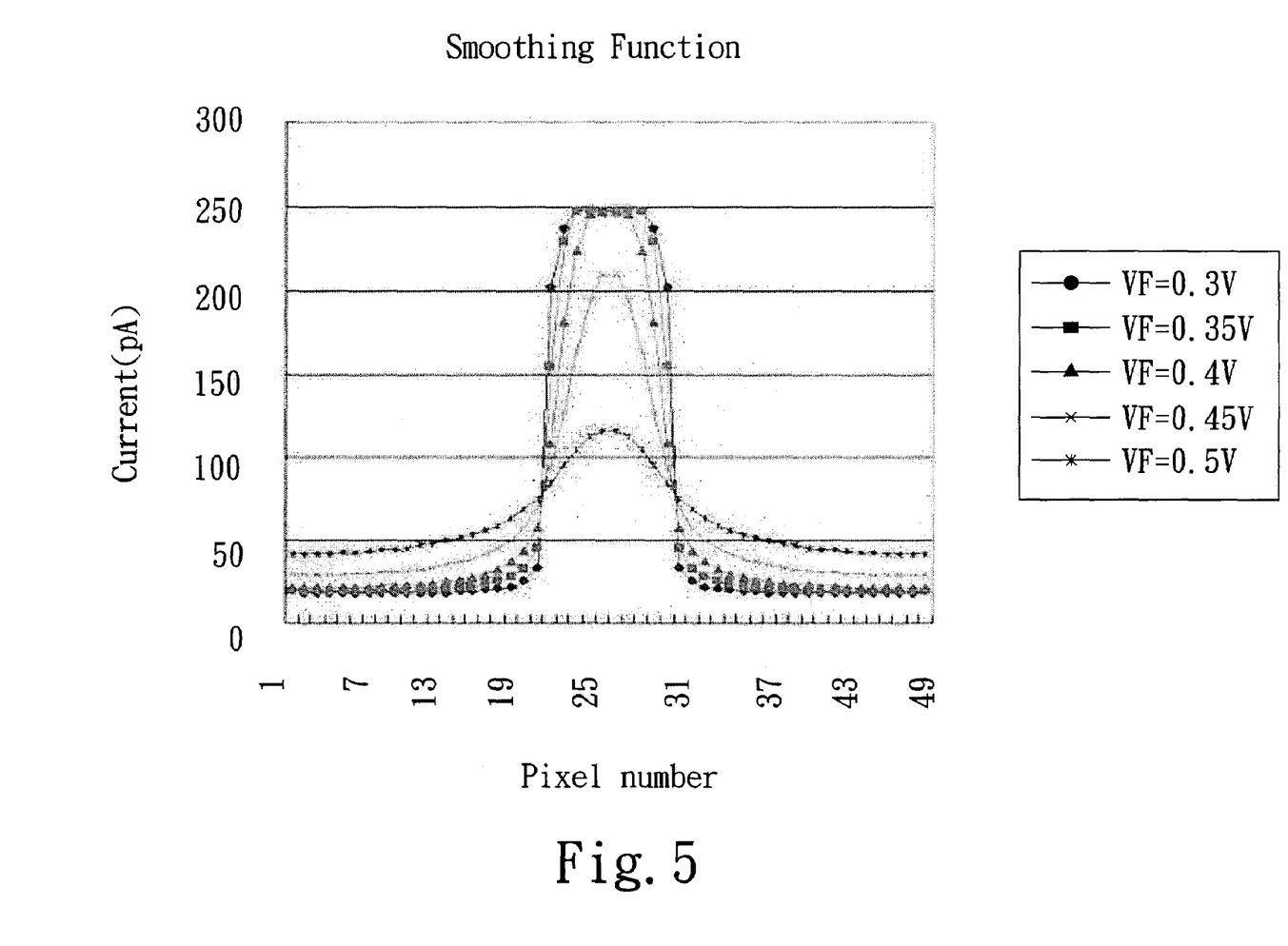
FIG. 5 is a smoothing function for induced photocurrent of this invention.

FIG. 5 is the smoothing function for induced photocurrent of this invention. FIG. 5 shows the different smoothing voltage(VF). If the incident lighting were larger, the photodiode of retinal sensor would induce bigger current. The resistance of smoothing network is able to be smaller because of the suitable scale of voltage variation in the smoothing network, i.e., various low-pass filter effects. In other words, if the smoothing range is in smaller, the image can not be very perceptible as it belongs to GLOBAL IMAGE; on the contrary, the image can be very perceptible, such as hollow eye, as it belongs to LOCAL IMAGE. The above functions, GLOBAL IMAGE and LOCAL IMAGE, are essential requirements.

Figure 6:
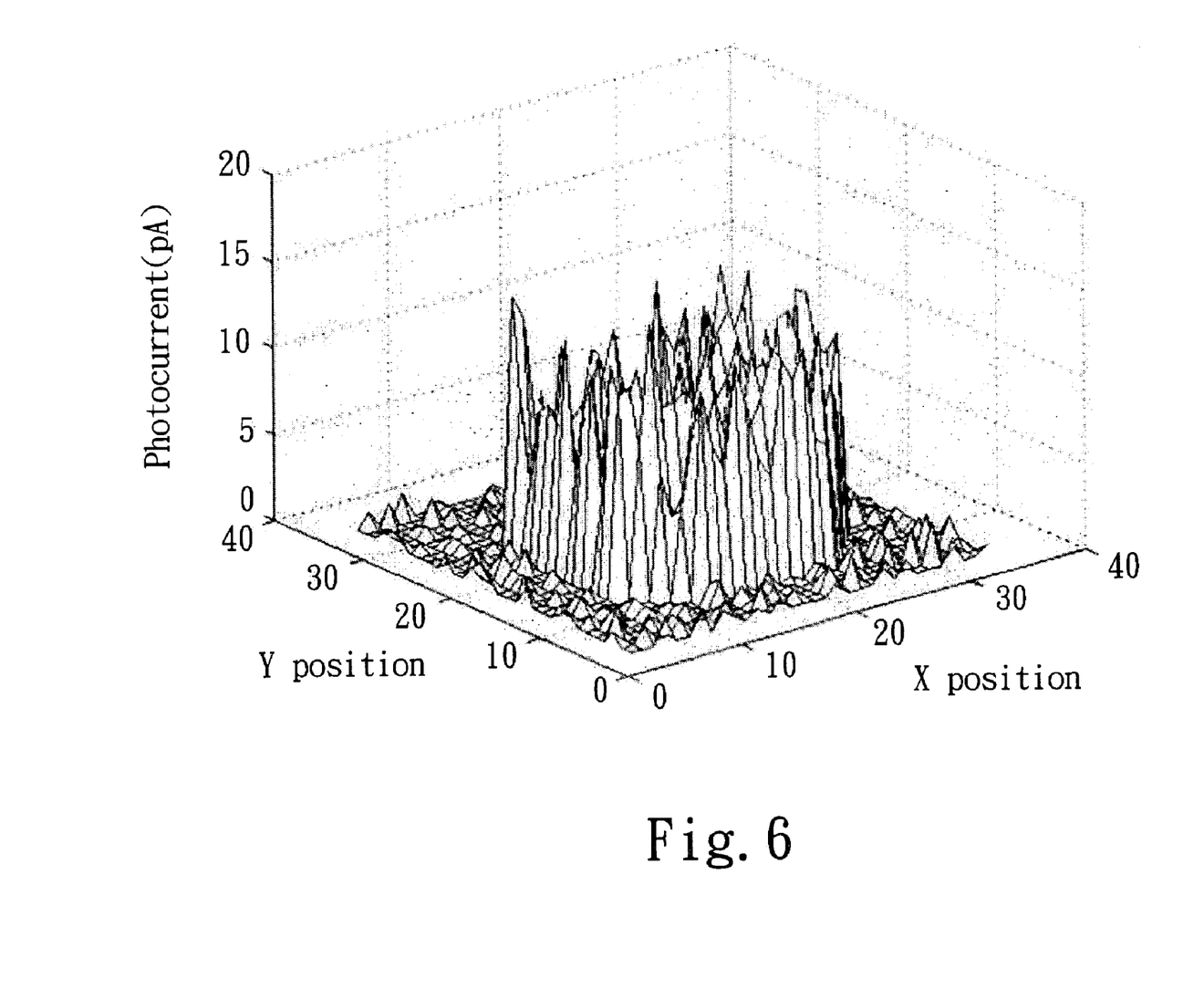
FIG. 6 is an inputted pattern-A with noise.
Figure 7:
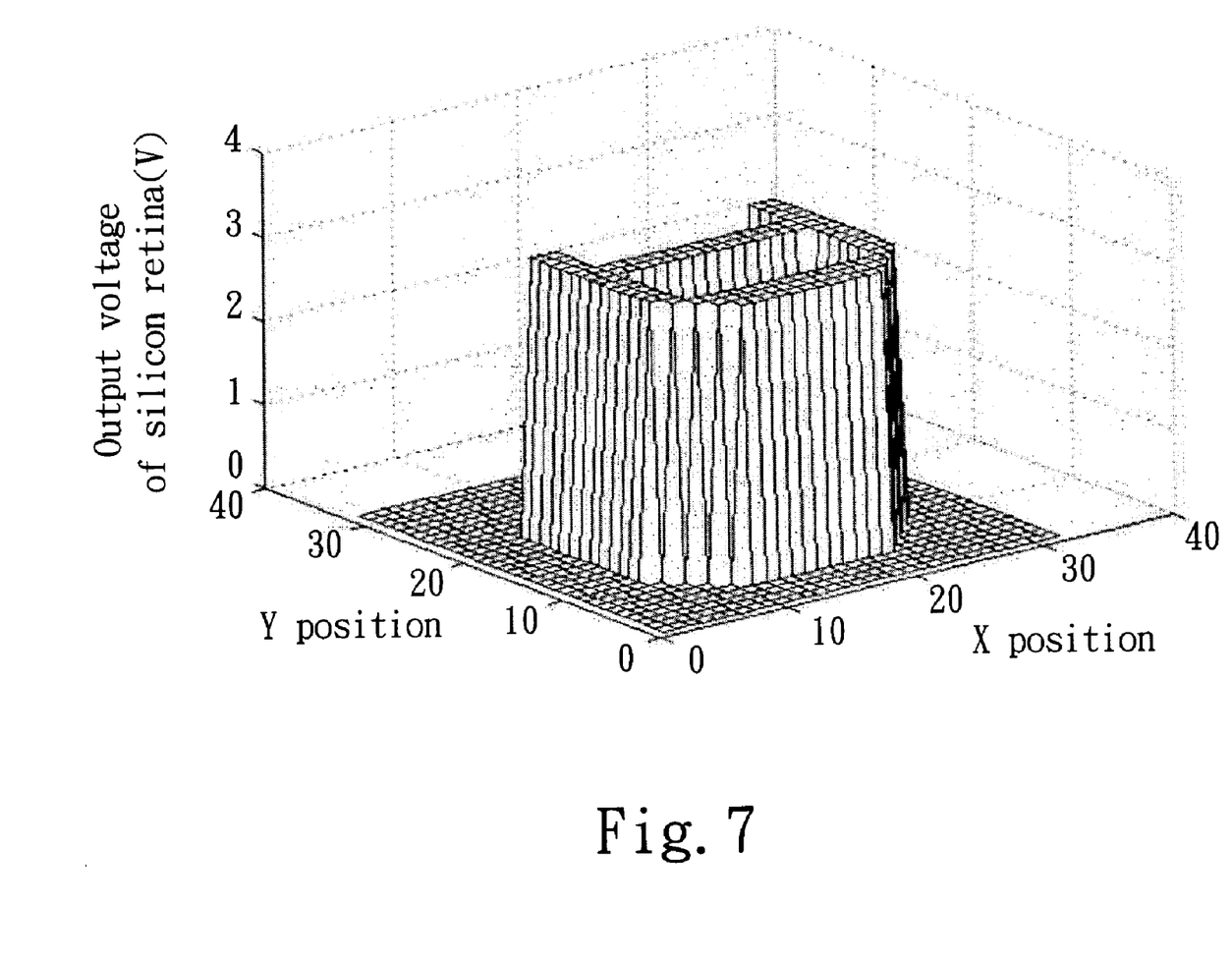
FIG. 7 is a 32×32 pixel output (Retina_out) of 2D retinal focal-plane sensor for input pattern-A with adaptive current Schmitt trigger and smoothing network.

FIG. 6 is the inputted pattern-A with noise and FIG. 7 is the 32×32 pixel output (Retina_out) of 2D retinal focal-plane sensor for input pattern-A with adaptive current Schmitt trigger and smoothing network. The details are described as follows.

FIG. 6 shows the inputted pattern-A with noise to be inputted into the 32×32 pixel array. Each pixel has the circuits of the retinal focal-plane sensor, the adaptive current Schmitt trigger and the smoothing network operating for outputting the results as shown in FIG. 7, the voltage in light environment is high(3.3V); whereas the voltage in dark environment is low(0 V).

Figure 8A:
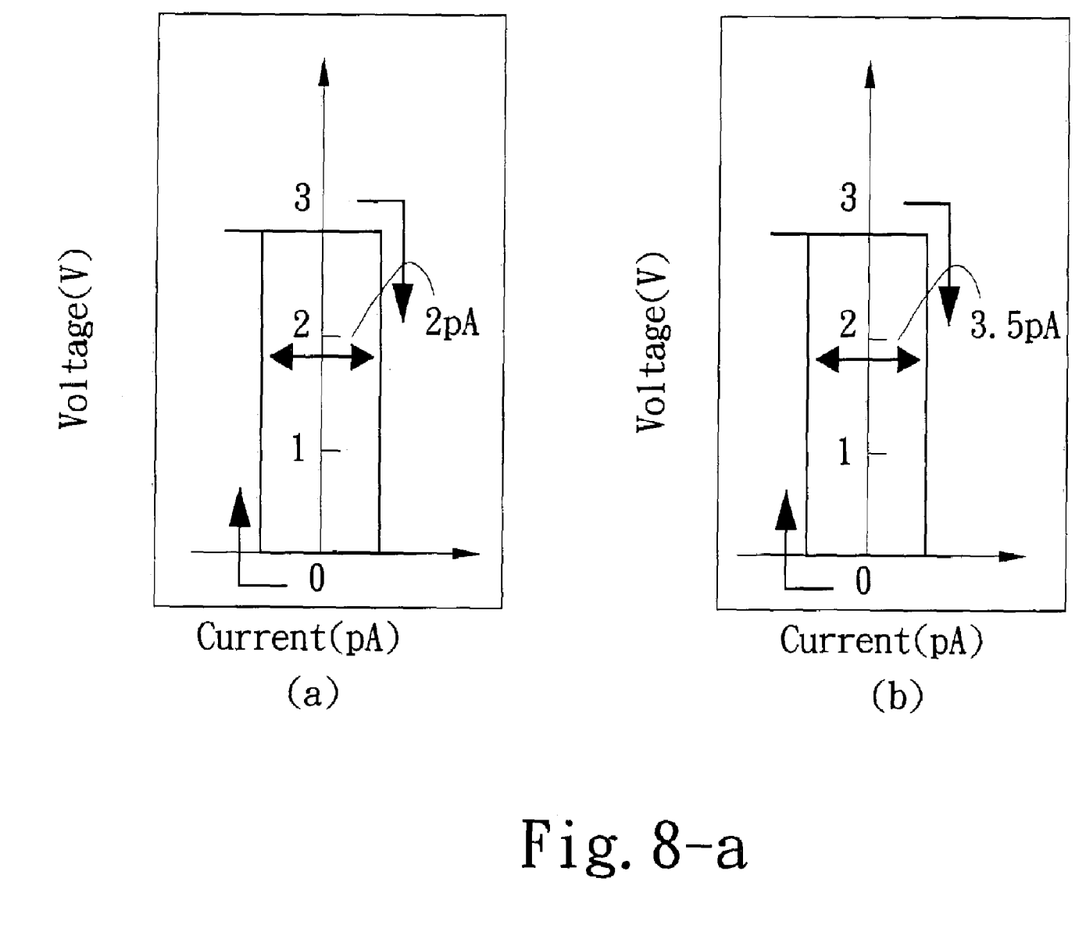
Figure 8B:
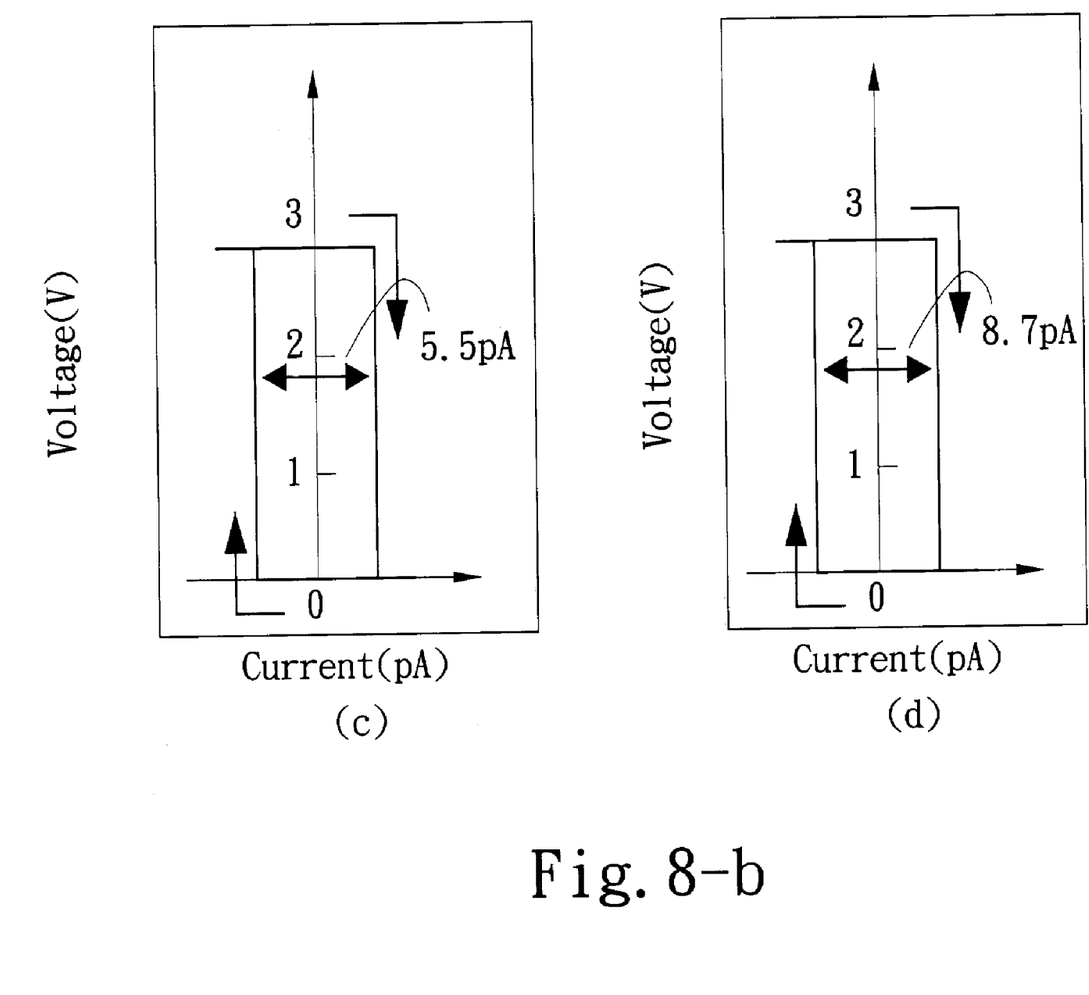

FIGS. 8-a and 8-b are the dc output characteristics of adaptive current Schmitt trigger of this invention.

If the induced photocurrent is bigger, the current ΔI could be adaptively adjusted without external controlling voltage, the adaptive current Schmitt trigger can enhances noise immunity and eliminate disturbance.

The adaptive current Schmitt trigger can be also used to perform similar functions as general circuit hysteresis; the smoothing network can be roughly replaced with general resistance circuit.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A Pseudo-BJT based retinal focal-plane sensing system, which mimics the three cell functions of P cell, H cell and B cell in a single pixel, and performs image sensing effect, comprising:

a row decoder, used for detecting external images, randomly selecting desired pixel and generating a row address;

a column decoder, used for detecting external images, randomly selecting desired pixel and generating a column address;

a pixel array module, used for reading pixels and detecting external images; in addition, outputting pixel voltages appointed by the row decoder and the column decoder one by one; wherein a voltage is generated when an image signal is received by the row address and the column address;

a data buffer, used for converting parallel data to serial data in order to reduce output pins of the chip;

a circuit for current hysteresis, used for eliminating noise disturbance and adjusted adaptively according to a value of induced photocurrent, which enhances noise immunity and eliminates noise disturbance; and a resistance circuit, having the function of Low-Pass Filter enabling high frequency noise to be eliminated with high tunable capability.

2. The Pseudo-BJT based retinal focal-plane sensing system of claim 1, wherein the P cell is to do photo-input sensing lacking the function of eliminating noise disturbance.

3. The Pseudo-BJT based retinal focal-plane sensing system of claim 1, wherein the H cell is to smooth an image retrieved by P cell with the Low-Pass Filter function enabling partial high frequent noise to be eliminated.

4. The Pseudo-BJT based retinal focal-plane sensing system of claim 1, wherein the B cell is to balance both outputs of P cell and H cell to attain edge detection and have the function of eliminating noise disturbance.

5. The Pseudo-BJT based retinal focal-plane sensing system of claim 1, wherein the Pixel Array Module can be a 32×32 pixel array.

6. The Pseudo-BJT based retinal focal-plane sensing system of claim 1, wherein the retinal focal-plane sensor adopts MOSFET transistors.

7. The Pseudo-BJT based retinal focal-plane sensing system of claim 1, being applied to image recognition, image tracing, robot vision, optical image detecting circuits of bar-code or character readers.

8. The Pseudo-BJT based retinal focal-plane sensing system of claim 1, wherein the circuit for current hysteresis is an adaptive current Schmitt trigger.

9. The Pseudo-BJT based retinal focal-plane sensing system of claim 1, wherein the resistance circuit is a smoothing network circuit.

10. A Pseudo-BJT retinal focal-plane circuit, comprising:

Photodiode D0, two Pseudo-BJTs, four adjustable N-channel MOS resistors of the smoothing network as Ms1-Ms4, a set of adaptive current Schmitt trigger comprising Mnf1-Mnf2 and Mpf1-Mpf2, an Inverter comprising transistors Mn and Mp, row and column controlled switch transistors, Pseudo-BJT P cells comprising Mp1 and Mp2, and Pseudo-BJT H cells comprising Mn1 and Mn2;

wherein the Photodiode DO is detected and photocurrent is then generated, incorporating Mp1 and MP2 for the P cell to process;

Mn1 and Mn2(Hcell) are used for incorporating with smoothing network, Ms1-Ms4 to activate the image smoothing function; the electric resistance of four MOS resistors is controlled by the gate voltage Vsmooth(VF) with the Low-Pass Filter function enabling partial high frequent noise to be eliminated;

Mp2 and Mn2 have the connection between thereof activating B cell functions; the adaptive current Schmitt trigger is composed of Mnf1-Mnf2 and Mpf1-Mpf2 for eliminating noise disturbance;

an outputted Inverter converts analogue signals into digital signals; and Row and Column controlled switch transistors are controlled by the Row and Column Decoders, thereby only appointed pixels are able to output signals (Retina_out).

* * * * *